United States Patent [19]

Buxbaum

[11] 4,101,526
[45] Jul. 18, 1978

[54] PROCESS FOR THE MANUFACTURE OF LINEAR POLYESTERS WHICH CONTAIN PHOSPHITES AND/OR PHOSPHATES

[75] Inventor: Lothar Buxbaum, Lindenfels, Odenwald, Fed. Rep. of Germany

[73] Assignee: Ciba-Geigy Corporation, Ardsley, N.Y.

[21] Appl. No.: 762,620

[22] Filed: Jan. 26, 1977

[30] Foreign Application Priority Data

Feb. 2, 1976 [CH] Switzerland ............... 1263/76

[51] Int. Cl.² ............... C08G 63/18; C08G 63/68
[52] U.S. Cl. ............... 528/179; 528/173; 528/181; 528/176; 528/279; 528/289; 528/281; 528/361; 528/293
[58] Field of Search ............... 260/75 R, 75 P, 75 N, 260/63 N, 47 C, 45.7 P

[56] References Cited

U.S. PATENT DOCUMENTS

| 3,489,722 | 1/1970 | Kotani et al. | 260/75 R |
| 3,796,691 | 3/1974 | Chimura et al. | 260/75 R |
| 3,907,754 | 9/1975 | Tershansy et al. | 260/75 R |
| 3,935,168 | 1/1976 | Rashbrook | 260/75 P |
| 3,998,793 | 12/1976 | Gey et al. | 260/75 R |

*Primary Examiner*—Lucille M. Phynes
*Attorney, Agent, or Firm*—Luther A. R. Hall

[57] ABSTRACT

The reaction for the manufacture of linear polyesters by polycondensing dicarboxylic acids, hydroxycarboxylic acids or the esters and diols thereof is speeded up by the addition of 1 to 25% by weight of esters of phosphoric and/or phosphorous acid.

20 Claims, No Drawings

PROCESS FOR THE MANUFACTURE OF LINEAR POLYESTERS WHICH CONTAIN PHOSPHITES AND/OR PHOSPHATES

The invention provides a process for the manufacture of linear polyesters which contain phosphites and/or phosphates.

In the manufacture of linear polyesters it is regarded as a particular economic disadvantage that relatively lengthy reaction times are required. Even with the most effective transesterification and polycondensation catalysts known at present, it is not possible to reduce the reaction times sufficiently. A variety of suggestions relating to the addition of reaction catalysts has been made with the object of cheaper methods of manufacture in mind.

For example, Japanese published patent specification No. 73,07,273 describes the addition of small amounts of phosphonates and phosphinates having only two reactive ester groups after an intrinsic viscosity of at least 0.40 dl/g in the polyester precondensate has been obtained.

Japanese published patent specification 48-46694 describes the addition of activated phosphates in amounts of up to 5% by weight, for example trichloro- or trinitrophenylphosphates.

These proposals have the disadvantage that the reaction catalysts employed are expensive and uneconomic. In addition, the activated phosphates have the grave disadvantage that, owing to their pronounced reactivity, all three ester groups of these trichloro- or trinitrophenylphosphates are capable of reacting. The result is that chain branchings occur in the polyester condensate and this occurrence in turn can result in gel formation and consequently in a premature discontinuance of the reaction. These polyesters are therefore without economic importance.

German Offenlegungsschrift No. 2,455,025 postulates the simultaneous addition of polycarbonates and phosphites or phosphates; but only the polycarbonates are shown to be reaction catalysts. The disadvantage of this proposal is that the incorporation of carbonate groups in the polymer chains results in a modification in the polycondensate which for many uses is undesired.

British patent specification No. 791,282 describes a process for the manufacture of fibers made from polyalkyleneterephthalates with an improved colour, wherein insignificant amounts, i.e. far less than 1% by weight, of a trivalent phosphorus compound are added at a specific time during the polycondensation. Phosphoric acid, the salts and esters thereof, as well as triphenylphosphite, are cited as trivalent phosphorus compounds. It is also stated that the polycondensation reaction can be speeded up if the addition of these small amounts of trivalent phosphorus compound is effected before a 30% reaction has been reached. If the addition is made later, then this catalytic effect is no longer observed. This British patent is therefore not concerned with the problem of incorporating larger amounts of esters of phosphoric acids into a polyester by condensation and simultaneously speeding up the reaction during the polycondensation.

The addition of stabilising amounts of phosphites during the polyester manufacture to stabilise the melt is commonly known and has been described in numerous publications. A reduction of the molecular weight is thereby suppressed and the colour quality of the polycondensate improved. The amounts added are in the ppm range, but can also be in excess of it, as proposed for example in U.S. patent specification No. 2,437,046 for specific polyesters.

The present invention has for its object to provide a process for the manufacture of polyesters while simultaneously speeding up the polycondensation during the manufacture of the polyesters, wherein specific esters of phosphoric acids are used as reaction catalysts.

Accordingly, the present invention provides a process for the manufacture of linear homo- and copolyesters which contain phosphites and/or phosphates and which are derived from aromatic and/or cycloaliphatic, unsaturated aliphatic and, if appropriate, in addition aliphatic dicarboxylic acids, hydroxycarboxylic acids and diols, by adding an ester of a phosphoric or phosphorous acid as reaction catalyst to a linear polyester precondensate containing catalyst and hydroxyl groups and having an average minimum degree of polycondensation $\bar{P}n$ of 50 and subsequently carrying out polycondensation in the melt and/or solid phase at temperatures between 170° and 230° C and in vacuo and/or in a flow of inert gas until a minimum degree of polycondensation of 100 is attained, which process comprises the addition of a phosphite or phosphate of the general formula I, or mixtures thereof, as reaction catalyst.

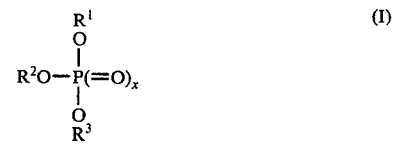

wherein $R^1$, $R^2$ and $R^3$ are the same or different, or represent linear or branched alkyl groups or aryl, aralkyl, cycloalkyl or cycloalkylalkyl groups which are unsubstituted or substituted by alkyl groups or by cyclohexyl, phenyl or phenylalkyl, and $x$ is 0 or 1, in amounts from 1 to 25% by weight, referred to the polyester precondensate.

The average degree of polycondensation $\bar{P}n$ is determined by dividing the average number of the molecular weight Mn by the monomer unit of the polyester. Methods of determining Mn are described for example in the "Encyclopedia of Polymer Science and Technology", Vol.9. (1969), pp. 182 ff.

It is preferred to add 1 to 15, in particular 2 to 15 and especially 2 to 10, percent by weight of phosphites or phosphates of the formula I and the degree of polycondensation is preferably $\bar{P}n$ 120 to 350, in particular 160 to 300. It is furthermore preferred that the degree of polycondensation Pn increases by at least 30% over 1 to 90, preferably 1 to 60, minutes. The minimum degree of polycondensation of the precondensate is preferably 75 to 150.

If it is desired to effect a good flame-resistant finish, preferably at least 4% by weight of a phosphite or phosphate of the formula I is added.

The linear polyesters are added on aliphatic, also on unsaturated and aromatic dicarboxylic acids, diols and hydroxycarboxylic acids, and can be in this connection homo- or copolymers. It is therefore possible, for example, that they contain one or more dicarboxylic acids, one or more diols, and, in addition, on or more hydroxycarboxylic acids. Polyesters which are derived only from hydroxycarboxylic acids are also comprised.

Suitable dicarboxylic acids are linear and branched, saturated and unsaturated aliphatic dicarboxylic acids, aromatic dicarboxylic acids, cycloaliphatic dicarboxylic acids and dicarboxylic acids which contain amino or imido groups or N-heterocyclic rings.

Suitable additional aliphatic dicarboxylic acids are for example: malonic acid, dimethylmalonic acid, succinic acid, octadecylsuccinic acid, pimelic acid, adipic acid, trimethyladipic acid, sebacic acid, azelaic acid, and dimeric acids (dimerisation products of unsaturated aliphatic carboxylic acids, such as oleic acid). Examples of suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-dicarboxylmethylcyclohexane, 4,4'-dicyclohexyldicarboxylic acid. Examples of suitable unsaturated dicarboxylic acids are: maleic acid, fumaric acid, methylmaleic acid or itaconic acid.

Suitable aromatic dicarboxylic acids are: terephthalaic acid, isophthalic acid, o-phthalic acid, 1,3-, 1,4-, 2,6- or 2,7-naphthalenedicarboxylic acids, 4,4'-diphenyldicarboxylic acid, 4,4'-diphenylsulphonedicarboxylic acid, 1,1,3-trimethyl-5-carboxyl-3-(p-carboxyphenyl)-indane, 4,4'-diphenyl ether-dicarboxylic acid, bis-p-(carboxylphenyl)-methane.

It is known that dicarboxylic acids which contain amido groups are obtained by reacting diamines or aminocarboxylic acids with dicarboxylic acids or the derivatives thereof which form the carboxy amide group. These carboxylic acids are described for example in DT-OS 2,453,448, DT-OS 2,150,808 and U.S. patent specification 2,925,405.

Dicarboxylic acids which contain imido groups are also known and described for example in DT-OS 2,453,448 and in U.S. patent specification 3,217,014. N-Carboxylmethyltrimellitic imide may be cited by way of example.

Suitable hydroxycarboxylic acids are aliphatic, cycloaliphatic, cycloaliphatic-aliphatic, aromatic and aromatic-aliphatic acids. As examples there may be mentioned: glycolic acid, $\beta$-propionic acid, $\beta$- or $\gamma$-hydroxybutyric acid, p-hydroxy-cyclohexanecarboxylic acid, para-hydroxymethylcyclohexanecarboxylic acid, m- or p-hydroxybenzoic acid, p-hydroxyphenylacetic acid.

Suitable diols are the aliphatic glycols, in particular those containing 2 to 10 carbon atoms in the molecule, cycloaliphatic and cycloaliphaticaliphatic diols, such as 1,4-dihydroxycyclohexane, 1,4-dihydroxymethylcyclohexane, aromatic and aromatic-aliphatic diols, such as hydroquinone, p-xylylene glycol or 2,5-dichloro-p-xylylene glycol, polyoxyaalkylene glycols, such as diethylene glycol, triethylene glycol, polyethylene glycol, substituted or unsubstituted bisphenols, such as bis-(p-hydroxyphenyl)-methylene, bis-(p-hydroxyphenyl)-ethylidene or bis-(p-hydroxyphenyl)propylidene and bis-(p-hydroxyphenyl)-sulphone or bis-(p-hydroxyphenyl)-ether. Hydroxyalkylated bisphenols are also suitable, for example 2,2-bis-[4-($\beta$-hydroxyethoxyphenyl)propane].

Further suitable diols are those which contain N-heterocyclic rings. Such diols are principally the $\beta$-hydroxyalkylated hydantoins, alkenylenebishydantoins and benzimidazolones, which can be partially or completely halogenated, in particular chlorinated and/or brominated, in the phenyl nucleus. These diols are described, for example, in DT-OS 2,453,448.

It is preferred to use at least 80 molar percent of terephthalic acid and at least 80 molar percent of aliphatic diols containing 2 to 10 carbon atoms, in particular 2 to 4 carbon atoms, or 1,4-dihydroxymethylcyclohexane, referred to the pure polyester. In particular, the polyesters contain linear aliphatic diols containing 2 to 4 carbon atoms and terephthalic acid.

Further preferred polyester-forming dicarboxylic acids, diols and hydroxycarboxylic acids are those which contain reactive functional polyester-forming groups of low reactivity. The process of the present invention is particularly suitable for these. The reactivity of the functional groups can in this case be impaired on account of steric hindrances, inter- or intramolecular interactions or mesomeric effects. It is difficult to prepare polyesters of higher molecular weight from such monomers or their polyesterforming derivatives by known processes, because on account of the low reactivity of the functional groups secondary reactions can predominate, which limit the molecular weight and can result in discolourations of the material. Diols and/or hydroxycarboxylic acids which contain secondary and/or phenolic alcoholic groups are preferred, and also diols which contain N,N-heterocyclic rings, for example, 1,1-methylene-bis[3-(2'-hydroxyethyl)-5,5-dimethylhydantoin], or 1,3-$\beta$-hydroxyalkylated benzimidazolones whose phenyl nucleus can also be partially or completely chlorinated and/or brominated, for example 1,3-bis($\beta$-hydroxyethyl)-benzimidazolone, or bisphenols.

A further advantageous group of diols, dicarboxylic acids or hydroxycarboxylic acids comprises those which contain halogen atoms, in particular bromine or chlorine atoms. These halogenated monomers are used for providing the polyesters obtained therefrom with a flame-resistant finish, whilst the known synergism in combining halogenated organic compounds and compounds of the elements of the 5th main group of the Periodic Table can be very advantageously exploited in the polyesters obtained from halogenated monomers. Examples of such halogenated monomers are: tetrabromo-bis-phenol-A-diglycol ether, 4,4'-dihydroxydecarbromobiphenyl, tetrabromo-p-xylylene glycol, 2,5-chloro-terephthalic acid or 1,3-bis-(hydroxyethyl)-4,5,6,7-tetrachloro- or -tetrabromo-benzimidazolone.

Alkyl groups represented by $R^1$ to $R^3$ in formula I contain preferably 4 to 18 carbon atoms. An acyl group is preferably a phenyl or phenylalkyl group. The cycloalkyl group contains preferably 5 to 12 ring carbon atoms and is in particular a cyclohexyl or cyclohexylalkyl group. The alkylene moiety in the aralkyl and cycloalkylalkyl group contains preferably 1 to 3 carbon atoms, in particular 1 carbon atoms. The cyclic groups are preferably substituted by 1 to 2 groups, especially in the positions 2, 4, 2,4 or 4,6. The substituents are preferably linear or branched alkyl groups of 1 to 18, especially 1 to 12, carbon atoms, a phenylalkyl group containing 1 to 3 carbon atoms in the alkylene moiety, cyclohexyl, phenyl and alkylphenyl groups. The triaryl- and trialkylphosphites and triaryl- and trialkylphosphates are particularly preferred.

Examples of suitable alkyl groups represented by $R^1$ to $R^3$ are: methyl, ethyl, propyl, iso-propyl, butyl, isobutyl, tert.-butyl, pentyl, hexyl, heptyl, octyl, nonyl, undecyl, dodecyl, pentadecyl, octadecyl, eicosyl, pentacosyl, triacontyl.

Examples of unsubstituted or substituted aryl, aralkyl, cycloalkyl and cycloalkylalkyl groups are: phenyl, $\alpha$- or $\beta$-naphthyl, cyclopentyl, cyclohexyl, cycloheptyl, cyclooctyl, cyclododecyl, benzyl, $\alpha$- or $\beta$-phenylethyl, α, β- or γ-phenylpropyl, cyclopentylmethyl, cyclohexylmethyl, cyclohexylethyl, o-, m- or p-methylphenyl, 2,4- or 4,6-dimethylphenyl, 2-ethylphenyl, 4-propylphenyl, 2-methyl-4-butylphenyl, p-tert.-butylphenyl, p-octylphenyl, 2-octyl-4-methylphenyl, nonylphenyl, bisnonylphenyl, dodecylphenyl, octadecylphenyl, methylcyclopentyl, methylcyclohexyl, ethylcyclohexyl, 3,3,5-trimethylcyclohexyl, 4-tert.-butylcyclohexyl, octadecylcyclohexyl, 2-or 4-cyclohexylphenyl, p-bisphenyl, p-benzylphenyl, p-(α-phenylethyl)-phenyl, p-methylcyclohexylmethyl, methylcyclopentylmethyl, methylcyclohexylethyl, octylcyclohexylmethyl, dodecylcyclohexylmethyl, methylbenzyl, ethylbenzyl, propylbenzyl, isopropylbenzyl, butylbenzyl, isobutylbenzyl, tert.-butylbenzyl, octylbenzyl, dodecylbenzyl, methylphenylethyl, methylphenylpropyl. Each of $R^1$ to $R^3$ is most preferably a substituted aryl group and in particular a phenyl, cresyl and nonylphenyl group.

The phosphites and phosphates used as reaction catalysts are either compounds which are known from the literature or they can be prepared by known methods.

It is preferred to use unsubstituted or substituted aryl phosphites and/or phosphates. If aliphatic phosphites and/or phosphates are used, the ester groups preferably contain altogether at least 10 carbon atoms in order to add phosphites or phosphates of relatively low volatility.

The process of the present invention can be used with advantage for linear polyester precondensates which contain radicals of thermally less stable starting components and whose decomposition and side-reactions during the polycondensation by known methods result in the formation of coloured and/or brittle materials. This advantageous use applies in particular to partially and/or chlorinated aromatic monomers which are simultaneously incorporated in the polyester by condensation to provide a flame-resistant finish, for example tetrabromo-bisphenol-A-diglycol ether, 4,4'-dihydroxydecabromobiphenyl, tetrabromo-p-xylylene glycol, 2,5-dichloroterephthalic acid or 1,3-bis-(2'-hydroxyethyl)-4,5,6,7-tetrachloro- or -tetrabromobenzimidazolone. The synergism of organic halogen compounds and compounds of the elements of the 5th main group of the Periodic Table is advantageously utilised herein.

It is also possible to use polyester waste as precondensates in accordance with the process of this invention, whereby the deterioration in the quality of this waste caused by the processing can be rectified and a repeated used made possible.

If the precondensates employed, which advantageously have a hydroxyl group content of at least 50%, contain too many carboxyl groups, an activation can be effected before carrying out the process of the invention in such a manner that, for example, an esterification and/or transesterification is carried out with glycols, optionally with a simultaneous addition of a corresponding catalyst. This step is particularly advantageous when using polyester waste.

The reaction is not dependent on a specific molecular weight of the precondensate. However, for economic reasons it is expedient to use polyesters of not too high and not too low a molecular weight. The polyesters used as precondensate have a minimum degree of polycondensation of 50. According to the process of the present invention, the molecular weight of polyesters of higher molecular weight and with a degree of polycondensation greater than 150, and which have been prepared for example with the aid of a solid-phase condensation process, can be increased further in relatively short spaces of time. The precondensates of the linear polyesters can be prepared by esterifying dicarboxylic acids or, hydroxycarboxylic acids or transesterifying the low molecular dialkyl or diaryl esters thereof at 150°-240° C, with diols in an inert atmosphere, for example in a nitrogen atmosphere, in the presence of catalysts and with the simultaneous removal of the water or alkanol which forms respectively, and thereafter carrying out the polycondensation at 200° to 270° C under reduced pressure in the presence of specific catalysts until the polycondensates have the desired degree of polycondensation.

The known metals, metal compounds or mixtures thereof, for example oxides, salts or organic compounds of calcium, magnesium, zinc, cadmium, manganese, titanium, cobalt, lead, germanium, tin, and antimony are used as transesterification or polycondensation catalysts. The amount can be 0.001 to 1% by weight, referred to the acids employed.

The addition of the phosphites and/or phosphates can be made all at once or by small amounts. If readily volatile phosphites or phosphates are used, it is advisable to make the addition by small amounts, when constituents which are distilled off can be added once more. Together with these reaction catalysts, 0.001 to 0.5% by weight of a polycondensation catalysts can also be added.

The process of the present invention is carried out in devices and reactors which are commonly employed for melt or solid-phase condensation reactions. The procedure is that the phosphite and/or phosphate, optionally together with a catalyst, is added to a precondensate of a linear polyester which is freshly prepared and in the molten state or which first has to be fused and the reaction is carried out in the melt phase at temperatures between 170° and 320° C and in vacuo and/or in a flow of inert gas until the desired viscosity is attained.

In a further embodiment of the process of the invention, a polyester precondensate is reacted initially in the melt phase with a phosphite and/or phosphate until a specific viscosity is reached, then, if appropriate after further addition of a phosphite or phosphate, a granulate is prepared, for example with an underwater granulator, the granulate is dried and then subjected to a reaction in solid phase. It is preferred to carry out the reaction in the melt phase and, if appropriate, subsequently in solid phase.

To carry out the reaction in solid phase, a polyester precondensate in granule form can first be homogeneously mixed, for example by regranulation from the melt phase, with a phosphite or phosphate, optionally together with a catalyst, and the resultant granulate reached at 5° to 50° C below the melting point in vacuo and/or in a flow of inert gas until the desired viscosity is attained. The alcohols or phenols liberated from the phosphites or phosphates respectively by transesterification are normally removed almost entirely from the polycondensate by distillation during the reaction.

It has been found that the degree of polycondensation increases by 30% and more over a short period of time, for example during the course of 3 to 35 or 3 to 15 minutes. It is therefore possible, and constitutes a preferred embodiment of the process of the present invention, to carry out the reaction in the melt phase in a device in which the reactants are homogeneously mixed within this reaction time, for example in extruders, in particular in a twin screw extruder. The polyesters of higher molecular weight prepared in this way can either be processed immediately afterwards to shaped objects or subjected to a solid-phase reaction in order to increase the viscosity still more. A particular advantage of this embodiment is that the reaction can be carried out in the melt continuously and not batchwise, as is the case when using a conventional reactor.

Before or on addition of the reaction catalysts to be used according to the invention, or before or after completion of the reaction, further inert additives of all kinds can be added to the polyesters, for example stabilisers, reinforcing fillers, in particular sized glass fibers, inorganic or organic pigments, fluorescent whitening agents, matting agents, crystallisation promoters and flame retardants, in particular halogen-containing organic compounds, for example decabromobiphenyl or tetrabromoterephthalic anhydride.

Surprisingly, the process of the present invention reduces the polycondensation time, that it to say, it speeds up the polycondensation. It is also surprising that no gel formation is observed even when larger amounts of catalyst are added. The conclusion must be drawn therefrom that, surprisingly, only two of the three reactive ester groups present in the amount of phosphites and phosphates which is incorporated in the polyester chains react. Extraction experiments indicate that, surprisingly, only a portion of the phosphites and phosphates added react, so that the polyesters obtained by the process of the present invention possess properties similar to the unchanged polymers on which they are based and, when larger amounts of phosphites and phosphates are used, contain a portion thereof admixed.

The resultant polyesters, of which the thermoplastic polyesters are preferred, are partly crystalline to amorphous, colourless to yellow polymers, depending on which linear polyester precondensates, which phosphites or phosphates are used and in what proportions they are employed. They have surprisingly good toughness properties and a lowered melt viscosity and are exceptionally suitable for manufacturing moulded articles of all kinds by means of the customary moulding processes, such as casting, pressing, laminating, injection moulding, injection blowing and extruding.

The unsaturated polyesters can be processed with the conventional coreactants, such as polystyrene and the customary processing assistants.

The polyesters obtaining according to the invention are particularly suitable for providing a flame-resistant finish with the halogenated organic compounds known for the purpose. Such a flame-resistant finish is desirable for many applications, for example for moulded articles in the electrical engineering field.

The polyesters are particularly suitable for use as engineering plastic materials from which it is possible to obtain moulded articles, such as gear wheels, containers for chemicals and/or foodstuffs, machine and apparatus parts, sheets, boards, filaments and films, as well as semi-finished products which can be machined. The polyesters can also be used for coating objects, for example by the known powder coating methods.

The following Examples will serve to illustrate the invention in more detail.

EXAMPLE 1

A 10 liter reactor, equipped with stirrer, nitrogen inlet, cooler and thermometer, is charged with 3880 g of dimethyl terephthalate (DMT), 2480 g of ethylene glycol, 1.31 g of zinc acetate and 1.4 g of antimony trioxide and the mixture is heated to 145° C. While stirring and introducing nitrogen, 99% of the theoretical amount of methanol is distilled off over 4 hours, and the temperature of the reaction mixture rises to 226° C. The reaction mixture is then conveyed to a second reactor and heated to 241° C. A vacuum of 50 torr is then applied in the course of half an hour by means of a water jet pump and the reaction temperature is simultaneously raised to 275° C. The vacuum is increased to 0.7 torr with a vacuum pump at the same reaction temperature in the course of half an hour and kept thereat for a further 1:35 hours. A sample taken at this time after eliminating the vacuum by means of nitrogen exhibits a degree of polycondensation ($\overline{P}n$) of 98. Then 5% by weight of triphenyl phosphate is added and a vacuum of 1 torr is applied immediately again. The $\overline{P}n$ rose to 130 over 35 minutes. The melt is pressed through spinnerets to filaments, which are chilled in water and comminuted to cylindrical granules measuring 2 × 3 mm. 300 g of these granules are dried first for 2 hours under a vacuum of 0.3 torr at 140° C in a 1 liter rotary evaporating flask, which is immersed in an oil bath, and crystallised. The reaction is thereafter continued for 6 hours in the solid phase under the same vacuum at 235° C. The end product has a $\overline{P}n$ of 234.

EXAMPLE 2

A 10 liter reactor, equipped with stirrer, nitrogen inlet, cooler and thermometer, is charged with 3000 g of dimethyl terephthalate, 2783 g of butanediol-1,4 and 1,77 g of titanium tetraisopropylate and the mixture is heated to 150° C. While stirring and introducing nitrogen, 98% of the theoretical amount of methanol, together with a small amount of tetrahydrofuran which has formed, is distilled off over 4 hours, and the temperature of the reaction mixture rises to 211° C. The reaction mixture is then conveyed to a second reactor and heated to 242° C. A vacuum of 70 torr is applied with a water jet pump in the course of half an hour and simultaneously the reaction temperature is raised to 250° C. On adjusting the reaction temperature to 250° C, the vacuum is raised to 0.5 torr in the course of half an hour and kept thereat for a further 3:25 hours. At this time a current consumption and rotation speed of the stirrer is observed, which corresponds to a $\overline{P}n$ of 87. With the aid of a vacuum tube, 150 g of triphenyl phosphate are added in vacuo. In the course of 50 minutes the current consumption of the stirrer increased so sharply that the reaction had to be discontinued. After spinning the melt through spinnerets and granulating the resultant filaments, which are chilled in water, a $\overline{P}n$ of 116 is attained 300 g of these granules are heated in a 1 liter rotary evaporated flask, which is immersed in an oil bath, under a vacuum of 0.3 torr to 210° C and kept for 10 hours at this temperature. The end product of this solid-phase condensation has a Pn of 221.

EXAMPLE 3

A 10 liter reactor, equipped with stirrer, nitrogen inlet, cooler and thermometer, is charged with 1940 g of dimethyl terephthalate (DMT), 1240 g of ethylene glycol, 712 g of 1,1-methylene-bis-[3-(2'-hydroxyethyl)-5,5-dimethyl-hydantoin[ (M-DMH) (20 molar percent, referred to DMT), 0.53 g of zinc acetate and 3.9 g of germanium butylate and the mixture is heated to 150° C, While stirring and introducing nitrogen, 97% of the theoretical amount of methanol is distilled off, and the temperature of the reaction mixture rises to 200° C.

A vacuum of 50 torr is then applied in the course of half an hour by means of a water jet pump and the the characteristic data of the end products are reported in Table 1.

Table 1

| Example | Polyester pre-condensate | Phosphite or phosphate | $\bar{P}n$ on addition | $\bar{P}n$ on conclusion | Reaction time (min) |
|---|---|---|---|---|---|
| 4 | PET | 5 % by weight of TPPO | 98 | 137 | 40 |
| 5 | PET | 5 % by weight of TPPO | 64 | 148 | 41 |
| 6 | PET | 5 % by weight of TPPO | 53 | 154 | 74 |
| 7 | PET | 5 % by weight of TNPP | 98 | 151 | 40 |
| 8 | PET | 5 % by weight of TPP | 98 | 165 | 3 |
| 9 | PET | 15 % by weight of TPPO | 98 | 198 | 30 |
| 10 | PET | 2 % by weight of TPPO | 98 | 128 | 45 |
| 11 | PET | 10 % by weight of TPPO | 98 | 160 | 30 |
| 12 | PBT | 5 % by weight of TPP | 104 | 168 | 13 |
| Comparison Examples | | | | | |
| 13 | PET | 0.5 % by weight of TPPO | 98 | 125 | 60 |
| 14 | PET | 0.5 % by weight of TPPO | 98 | 133 | 60 |
| 15 | PBT | 0.5 % by weight of TPPO | 87 | 159 | 120 |

| Example | Polyester | Phosphite or Phosphate | $\bar{P}n$ on addition | $\bar{P}n$ at conclusion | Reaction time (min) |
|---|---|---|---|---|---|
| 16 | PET, 2,5 mol.% of stilbenedicarboxylic acid | 5% by weight of TPPO | 98 | 156 | 33 |
| 17 | PBT, 5 mol.% of sebacic acid | " | 105 | 165 | 20 |
| 18 | PBT, 10 mol.% of azelaic acid | " | 110 | 170 | 25 |
| 19 | PBT, 5 mol.% of succinic acid | " | 106 | 169 | 26 |
| 20 | PBT, 3 mol.% of dodecanedicarboxylic acid | " | 106 | 175 | 23 |
| 21 | PET, 20 mol.% of isophthalic aid | " | 98 | 145 | 41 |
| 22 | PET, 5 mol.% of o-phthalic acid | " | 98 | 139 | 40 |
| 23 | Poly(ethylene-isophthalate) | " | 100 | 152 | 52 |
| 24 | Poly(butylene-isophthalate) | " | 110 | 176 | 32 |
| 25 | PET, 5 mol.% of 4,4'-diphenylsulphonedicarboxylic acid | " | 95 | 144 | 42 |
| 26 | PBT, 20 mol.% of hexanediol | " | 105 | 168 | 23 |
| 27 | PET, 7.5 mol.% of neopentyl glycol | " | 98 | 144 | 46 |
| 28 | PBT, 10 mol.% of 1,4-cyclohexanedimethanol | " | 105 | 161 | 29 |
| 29 | PBT, 20 mol.% of cyclohexanedicarboxylic acid-1,4 | " | 105 | 165 | 35 |
| 30 | PET, 40 mol.% of cyclohexanedicarboxylic acid-1,4 | " | 95 | 140 | 55 |
| 31 | PBT, 3 mol.% of 1,3-bis(hydroxyethyl)-4,5,6,7-tetrabromobenzimidazolone | 15% by weight of TNPP | 105 | 170 | 18 |

TPPO : triphenyl phosphate
TNPP : tris(nenyl) phosphite
TPP : triphenyl phosphite
PET : polyethylene terephthalate
PBT : polybutylene terephthalate reaction temperature is simultaneously raised to 275° C. The vacuum is increased to 0.4 torr with a vacuum pump at the same reaction temperature in the course of half an hour and kept thereat for a further 50 minutes. A sample taken at this time after eliminating the vacuum by means of nitrogen exhibits a $\bar{P}n$ of 98. Then 20 percent by weight of triphenyl phosphate is added and a vacuum of 0.4 torr is applied immediately again. The $\bar{P}n$ rose to 145 in the course of 48 minutes. The melt is pressed through spinnerets to filaments, which are chilled in water and comminuted to colourless cylindrical granules measuring 2 × 3 mm. Before precrystallisation in acetone, 300 g of these granules are dried fast in a 1 liter rotary evaporating flask, which is immersed in an oil bath, for 1 hour under a vacuum of 0.4 torr at 80° C and then heated to 210° C over 6 hours. After a further 18 hours at this temperature the $\bar{P}n$ of these granules had risen to 248.

EXAMPLES 4 - 31

Polyesters with a specific relative viscosity are prepared by a reaction analogous to that described in Examples 1 to 3. Thereafter a specific amount of a phosphite or phosphate is added, and, after applying a vacuum in the melt phase, the reaction is continued. The composition of the polyesters, the reaction times and

EXAMPLE 32

In accordance with the procedure of Example 1, 20% by weight of TNPP is added to PET with a $\bar{P}n$ of 98 and after 5 minutes a polyester with a $\bar{P}n$ of 169 is obtained. A phosphorus determination gives 1.6% by weight of phosphorus in the polyester.

EXAMPLE 33

Following the procedure of Example 3 two copolyesters are prepared to one of which 25% by weight of TPPO is added and the combustibility is determined in accordance with ASTM. The results are reported in Table 2.

Table 2

| | Combustibility according to ASTM D 635 rod thickness 0.64 cm | | |
|---|---|---|---|
| Composition | AEB, | ATB | combustion rate |
| | cm | sec | cm/min |
| PET, 15 mol. % of M-DMH + 25% by weight of TPPO | 2* | >5 | — |
| PET, 15 mol. % of M-DMH | — | — | 1,8 |

*burning of 2 cm results only during the ignition of 30 sec
AEB = average extent of burning
ATB = average time of burning

I claim:

1. An improved process for the manufacture of high molecular weight linear homo- or copolyesters, which contain moieties selected from the group consisting of phosphites and phosphates, and which are derived from aromatic and/or cycloaliphatic, unsaturated aliphatic and optionally in addition aliphatic, dicarboxylic acids, hydroxycarboxylic acids and diols, and which are formed first by transesterification process in the presence of a catalyst followed by a preliminary precondensation to give a precondensate containing hydroxy groups and with an average minimum degree of polycondensation $\bar{P}n$ of 50, wherein the improvement comprises adding from 1 to 25% by weight, based on the polyester precondensate, of a reaction catalyst of the general formula I, or mixtures thereof,

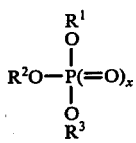

(I)

wherein $R^1$, $R^2$ and $R^3$ are the same or different, and represent linear or branched alkyl groups, aryl, aralkyl, cycloalkyl or cycloalkylalkyl; or said aryl, aralkyl, cycloalkyl or cycloalkylalkyl groups substituted by alkyl, cyclohexyl, phenyl or phenylalkyl, and $x$ is 0 or 1, and completing the polycondensation in the melt or solid phase at a temperature between 170° C and 320° C until a minimum degree of polymerisation $\bar{P}n$ of 100 is attained.

2. A process according to claim 1, wherein 1 to 15 by weight of reaction catalyst is added.

3. A process according to claim 1, wherein the degree of polycondensation of the polyester precondensate is $\bar{P}n$ 75 to 150.

4. A process according to claim 1, wherein alkyl groups represented by $R^1$ to $R^3$ in the phosphites or phosphates of the formula I contain 4 to 18 carbon atoms.

5. A process according to claim 1, wherein the aryl, aralkyl, cycloalkyl or cycloalkylalkyl groups are substituted by 1 to 2 groups in the 2, 4, 2,4 or 4,6 positions.

6. A process according to claim 1, wherein the alkyl groups as substituents contain from 1 to 18 carbon atoms.

7. A process according to claim 1, wherein aryl is phenyl, aralkyl is benzyl, cycloalkyl is cyclohexyl and cycloalkylalkyl is cyclohexylmethyl.

8. A process according to claim 1, wherein a triaryl- or trialkylphosphite or a triaryl- or trialkylphosphate is added as reaction catalyst.

9. A process according to claim 8, wherein triphenyl-, tricresyl- or trinonylphosphite or triphenyl-, tricresyl- or trinonylphosphate is added as reaction catalyst.

10. A process according to claim 1, wherein the polyester precondensate is prepared partially or wholly from diols or dicarboxylic acids which contain chlorine and/or bromine.

11. A process according to claim 1, wherein the polyester precondensate is synthesised partially or wholly from momomers which contain secondary or phenolic hydroxyl groups or which are β-hydroxyalkylated benzimidazolones and monomeric or oligomeric hydantoins.

12. A process according to claim 1, wherein the phosphite or phosphate of the formula I is added to the polyester precondensate in the melt phase, the mixture is reacted initially in the melt phase and thereafter, optionally after a further addition of a phosphite or phosphate of the formula I, the reaction is continued in the solid phase until the minimum degree of polycondensation of 100 is attained.

13. A process according to claim 1, wherein the polyester precondensate contains at least 80 molar percent, referred to the dicarboxylic acids, of an aromatic dicarboxylic acid.

14. A process according to claim 1, wherein the polyester precondensate contains at least 80 molar percent, referred to the dicarboxylic acids, of terephthalic acid, and at least 80 molar percent, referred to the diols, of aliphatic diols containing 2 to 10 carbon atoms.

15. A process according to claim 14, wherein the polyester precondensate contains ethylene glycol, trimethylene or tetramethylene glycol.

16. A process according to claim 1 wherein 2 to 15% by weight of reaction catalyst is used.

17. A process according to claim 1 wherein 2 to 10% by weight of reaction catalyst is used.

18. A process according to claim 6 wherein the alkyl groups as substituents contain from 1 to 12 carbon atoms.

19. A process according to claim 14 wherein the aliphatic diols contain 2 to 4 carbon atoms.

20. A polyester composition prepared by the process according to claim 1.

* * * * *